Sept. 1, 1964     H. N. THOMAS     3,147,422
ELECTRONIC MOTOR CONTROL SYSTEM

Filed April 16, 1963     3 Sheets-Sheet 1

HARRISON N. THOMAS,
*INVENTOR.*

BY

*ATTORNEYS*

HARRISON N. THOMAS,
*INVENTOR.*

United States Patent Office 3,147,422
Patented Sept. 1, 1964

3,147,422
ELECTRONIC MOTOR CONTROL SYSTEM
Harrison N. Thomas, Huntsville, Ala., assignor to the United States of America as represented by the Administrator of the National Aeronautics and Space Administration
Filed Apr. 16, 1963, Ser. No. 273,534
9 Claims. (Cl. 318—260)
(Granted under Title 35, U.S. Code (1952), sec. 266)

The invention described herein may be manufactured and used by or for the Government of the United States of America for governmental purposes without the payment of any royalties thereon or therefor.

This invention relates to electrical systems in which means are provided for electrically controlling the speed of a motor and particularly to a system for accomplishing rapid and precise decreases in motor speeds.

There are many applications in which motor speeds must be very precisely controlled at selected speeds and wherein when there is a required change of one of these speeds to a different speed, the change will be accomplished rapidly with no tendency to free-wheel between speeds. Known motor control systems appear particularly deficient where the required shift in speed is from a higher to a lower one. During such shifts of speed there is a tendency for the motor to coast or free-wheel for a period before settling down to the lower speed. While various forms of electrical braking have been devised in the past, they are generally of the on-off type and have generally been found unsuitable for inter-speed braking.

It is, accordingly, an object of this invention to provide an improved electronic motor control system which overcomes this deficiency and introduces a degree of precision in speed control not known to have been previously obtainable.

In accordance with the invention the motor to be controlled is powered by two energizing circuits. Each of these circuits consists of an alternating current supply connected in series through current control means, such as a thyratron tube, to the motor. One of the energizing circuits provides a driving power for the motor at a speed determined by its current control means and the other energizing circuit provides electrical braking power to the motor of a magnitude determined by its current control means. The driving circuit current control means is regulated by a control signal which includes substantially one-half of a selected speed input voltage and substantially one-half of a voltage representative of the counter electromotive force (E.M.F.) of the motor and wherein these two voltages are combined in a bucking fashion, the speed setting voltage tending to increase speed and the counter E.M.F. voltage tending to retard speed. The braking circuit control means, which is normally electrically cut off, is regulated by a control signal including an oppositely arranged combination of the speed setting voltage and counter E.M.F. voltage. In addition, the braking control signal includes a supplementary voltage which varies directly with the speed of the motor (supplied, for example, by a D.C. tachometer or generator) and which is poled to tend to apply an increased braking power.

Where the current control means are thyratron tube stages, appropriately phase shifted alternating current sources are also provided in series with the control signal and thyratron grids to achieve a normal 90° lagging grid voltage with respect to anode-cathode voltages of the thyratron tubes. When necessary to attain the normally cutoff condition of the thyratron tube in the braking control means, an additional fixed negative bias source is connected common to both control signals.

Other objects, features and advantages of the present invention will be apparent from the following detailed description when considered together with the accompanying drawings in which.

Figure 1:
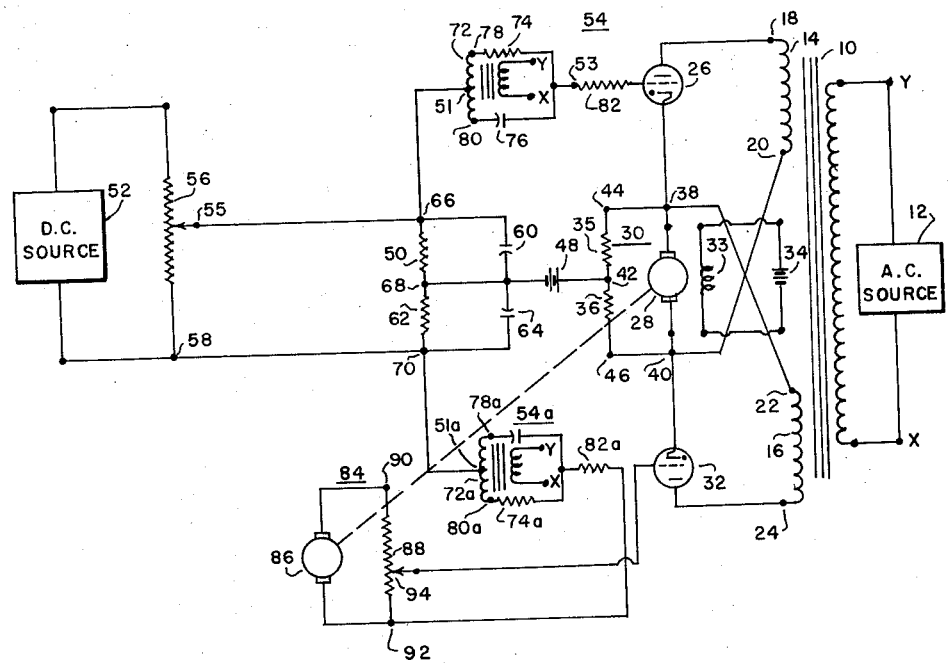
FIG. 1 is an electrical schematic diagram of a basic embodiment of the invention.

Referring now to FIG. 1, primary terminals X and Y of transformer 10 are appropriately energized from an alternating current supply 12 (e.g. 60 cycles) and transformer secondary windings 14 and 16 provide a first alternating current output (e.g. 110 volts) across terminals 18 and 20 and a second, identical, output across terminals 22 and 24. The anode-cathode circuit of thyratron 26 is connected in series with winding 14 and armature 28 of D.C. shunt motor 30, with the anode-cathode interconnections being poled to produce current flow through armature 28 in a first (running or driving) direction. Similarly, the output terminals of secondary winding 16 are connected in series with thyratron 32 and armature 28, however, the cathode-anode circuit of thyratron 32 is poled in this instance to allow current to flow through armature 28 in the opposite (braking) direction to that permitted by thyratron 26. Field coil 33 of motor 30 is separately powered by D.C. source 34. Resistors 35 and 36 are connected at cathode terminals 38 and 40 in series across armature 28 and are of equal value (e.g. 2,000 ohms) to equally divide the voltage across armature 28 at terminal 42 with respect to terminals 44 and 46.

The effective grid potential applied to thyratron 26 consists of the negative voltage across resistor 35, which is one-half the armature voltage (or counter E.M.F. voltage), a negative voltage from fixed bias source 48 (e.g. 4.5 volts), an applied positive control voltage across resistor 50, and an alternating voltage applied between terminals 51 and 53 of A.C. source 54.

The control or input voltage across resistor 50 represents ½ of the input control or setting voltage, from D.C. regulated voltage source 52 (e.g. 105 volts D.C.) and is available at any desired positive value between zero and maximum value at movable terminal 55 of potentiometer 56 (connected across source 52) with respect to fixed terminal 58. Resistor 50, which is paralleled by filter capacitor 60, is connected in series with resistor 62, of equal value, paralleled by a similar capacitor 64 between fixed terminal 58 and movable terminal 55. Thus, $+\frac{1}{2}$ the control voltage appears at the top of resistor terminal 66 with respect to center terminal 68 and $-\frac{1}{2}$ the control voltage appears at the bottom terminal 70 with respect to terminal 68. Tachometer 86 is driven by motor 30.

Alternating current source 54 consists of transformer 72, resistor 74 (e.g. 56,000 ohms) and capacitor 76 (e.g. .05 mf. to provide equal—56,000 ohms—reactance at 60 cycles) with resistor 74 and capacitor 76 being connected in series across output terminals 78 and 80 of transformer 72. Transformer 72 is energized at terminals X and Y by alternating current source 12 and provides a low voltage (e.g. 6.3 volts) output at terminals 78 and 80. The effect of this combination is to provide a voltage between source output terminals 51 and 53 which is shifted in phase by 90° from the input applied to terminals X and Y and is shifted in phase by 90° (lag) from the anode-cathode voltage applied to thyratron 26. The grid of thyratron 26 is connected through parasitic or stabilizing resistor 82 (e.g. 500 to 10,000 ohms) to terminal 53 of alternating current source 54 to complete the circuit between the cathode and grid of thyratron 26.

Alternating current source 54a, employing transformer 72a, resistor 74a and capacitor 76a, is identical to current source 54 and functions similarly in a cathode grid circuit of thyratron 32 consisting of resistor 36, source 48, resistor 62, resistor 82a, and tachometer circuit 84.

Tachometer circuit 84 consists of direct current generator or tachometer 86 (e.g. develops 2 to 3 volts per thousand revolutions per minute) and potentiometer 88 connected across the output terminals 90 and 92 of tachometer 86. The output of tachometer circuit 84, which is connected in series with the grid-cathode circuit just described is between movable terminal 94 of potentiometer 88 and end terminal 92 common to potentiometer 88.

It will be observed that the voltages developed in the cathode-grid circuit of thyratron 26 and in the cathode-grid circuit of thyratron 32 function oppositely. That is the voltages developed tend to keep thyratron 26 turned on and thyratron 32 turned off. Thyratron 26 functions to supply motor 30 with running power and thyratron 32 serves to provide, when needed, a braking power.

Figure 2:
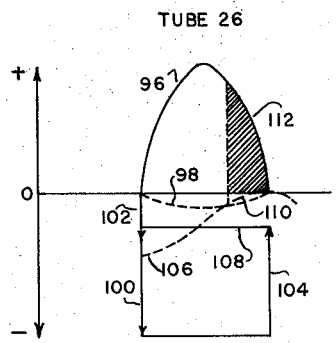
FIGS. 2–5 are graphical illustrations depicting operation of the embodiment of the invention shown in FIG. 1.

To explain the operation of the circuit, reference is made to FIGS. 2–5 illustrating the relation between the various voltages developed in the circuit. FIG. 2 is representative of the operation of thyratron 26 with the potential applied to the anode with respect to the cathode by secondary winding 14 shown by wayform 96. Only the positive half cycles are illustrated inasmuch as thyratron 26 is cut off during negative half cycles. Line 98 illustrates the threshold voltage, or grid potential above which thyratron 26 conducts. Cathode-grid voltage is computed by adding negative D.C. counter E.M.F. voltage 100 (across resistor 35), negative bias voltage 102 (source 48), positive D.C. control voltage 104 (across resistor 50) and A.C. voltage 106 across source 54. The results are that alternating voltage 106 is added to the D.C. voltages at a D.C. level 108 and intersects the threshold voltage 98 at point 110 to fire thyratron 26 for the period and at a magnitude represented by shaded portion 112.

Figure 3:
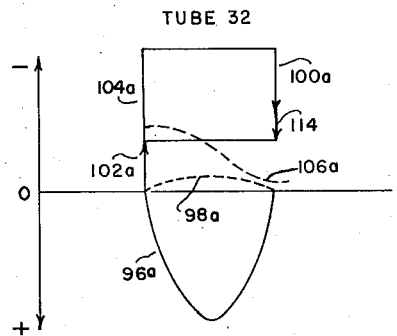

FIG. 3 is illustrative of the operation of thyratron 32 for the same setting of movable arm 55 and for the same period of time illustrated in FIG. 2. Waveforms having counterpoints in FIG. 2 are designated with the same number but with an "a" suffix. It will be observed that the summation of the grid voltage sources is such that A.C. bias 106a, representing the summation, does not cross over curve 98a and thus thyratron 32 does not conduct at all. It is important, however, that the cathode-grid voltage of tube 32 be such during normal running (not accelerating or braking) that it is just below the threshold value which would produce conduction. This condition is accomplished by tachometer 86 which provides an additional grid-cathode voltage 114 which tends to produce conduction. This type source (instead of a fixed voltage one) is employed to achieve the variable voltage (varying directly with speed) necessary to maintain the degree of proximity to threshold value required. This requirement is that the proximity be such that with slight increase in counter E.M.F. (indicating armature speed in excess of existing setting of potentiometer arm 55) or decrease in control voltage 104 (due to a change to a lower voltage setting of potentiometer arm 55) that voltage 106a crosses threshold voltage 98a and fires tube 32, a condition illustrated in FIG. 5.

Figure 4:
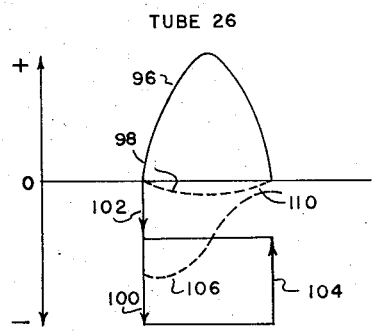
Figure 5:
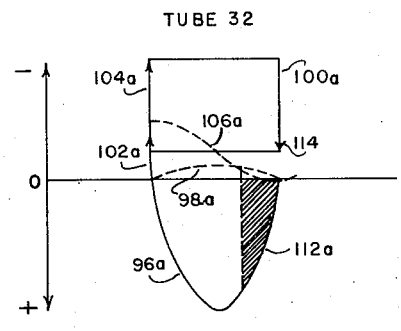

Conversely, the biasing of tube 26 is such that a slight decrease in control voltage 104 or increase of counter E.M.F. voltage 100, cuts off conduction in tube 26, the condition illustrated in FIG. 4.

Assume, for example, that movable arm 55 of potentiometer 56 is lowered to produce a lower control voltage across resistors 50 and 62 in order to slow motor 30 to a reduced speed setting. Inasmuch as the operating grid voltage between the cathode and grid of thyratron 26 is quite small during normal running, a small decrease in voltage produced by this change in potentiometer setting will drop the cathode-grid voltage 106 of thyratron 26 below the point of conduction (FIG. 4) and remove driving power from motor 30. This, then will tend to cause motor 30 to coast. However, the same change in the setting of potentiometer 56 lowers voltage 106a (FIG. 5) to the point where thyratron 32 commences to conduct and it continues conducting for the period illustrated by the shaded portion 112a producing a reverse current through motor 30 and winding 16 which exerts a braking force and prevents coasting. As motor 30 slows, the counter E.M.F. voltage 100 decreases and when it reaches a predetermined value, voltage 106a will no longer intercept threshold voltage 98a and thyratron 32 will cut off to remove the braking power. At this same point thyratron 26 will cut back on to sustain the running speed at this new speed setting which is determined by the position of potentiometer arm 55.

Figure 6:
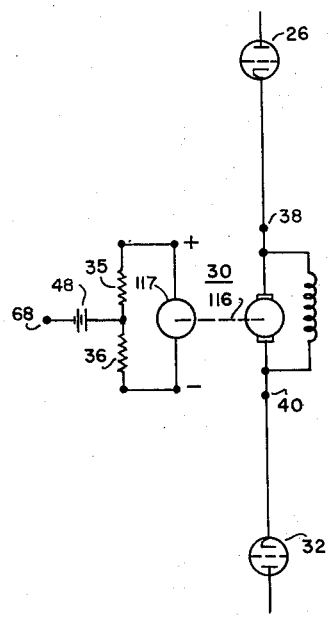
FIGS. 6–8 are electrical schematic diagrams of modifications of the embodiment of the invention shown in FIG. 1.

FIG. 6 illustrates a modification of the circuit shown in FIG. 1 in which the counter E.M.F. voltages (voltages 100 and 100a) across resistors 35 and 36 are developed by an additional tachometer or generator 117 which is driven by a shaft connection 116 to motor 30. When this system is employed, the level of voltages 100 and 100a with respect to control voltages produced from voltage source 52 should be adjusted (reduced if the output of the tachometer 116 is less than counter E.M.F.) to preserve the same operating relation described with respect to the circuit of FIG. 1.

Figure 7:
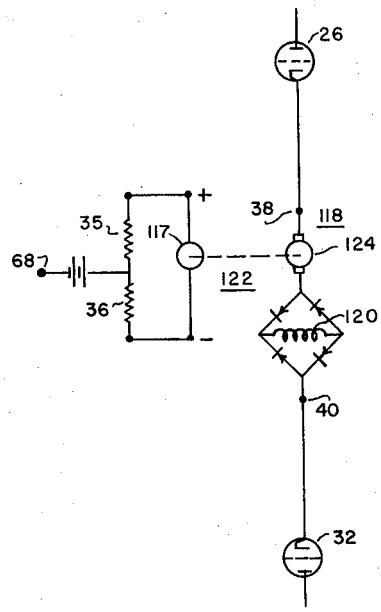

FIG. 7 shows a modification of the circuit of FIG. 6 in which the motor to be controlled, motor 118, is a series D.C. motor. In this configuration motor field 120 of motor 118 is driven through bridge rectifier circuit 122 which is in series with armature 124 of motor 118. The purpose of bridge circuit 122 is to allow current to pass in one direction through armature 124 when supplied by tube 26 and in another direction when supplied a braking power by tube 32 and at the same time to allow the current to pass through field 120 in the same direction regardless of the direction of current flow through armature 124. This is necessary in order to provide a breaking force by virtue of current flow from tube 32 in view of the characteristics of a direct current motor wherein normal reversal of current flow though both armature and field will not produce a reversal in motor torque.

Figure 8:
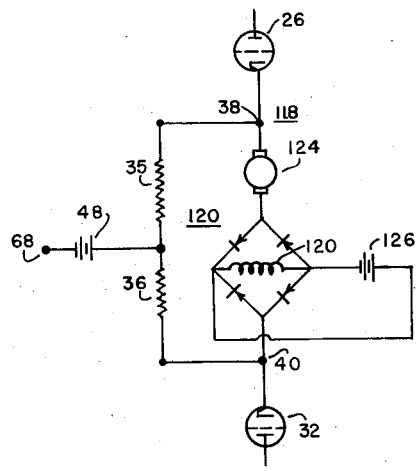

FIG. 8 shows a modification of the circuit of FIG. 7 in which tachometer 116 is dispensed with and series motor 118 is controlled in part by a counter E.M.F. which is maintained by applying a small D.C. bias from source 126 across field 120. By means of this technique there is maintained (when the drive voltage is cut off) a counter E.M.F. between terminals 38 and 40 which may be employed as in the case of the shunt motor shown in FIG. 1 to provide the counter E.M.F. voltages across resistors 35 and 36 required by the control circuit of the invention.

The basic operation described above with respect to FIGS. 1–5 exists for the circuits of FIGS. 6–8 and thus each embodiment of the invention described provides an automatic control braking force which electrically switches on and off at precise times to achieve rapid and certain reduction from higher to lower operating speeds.

Obviously, many modifications and variations of the present invention are possible in the light of the above teachings. It is, therefore, to be understood that within the scope of the appended claims the invention may be practiced other than as specifically described.

I claim:
1. An electronic motor control system comprising:
 (a) first current control means responsive to a first electrical signal for variably controlling the current in a first direction supplied to a motor to be controlled;
 (b) second current control means responsive to a second electrical signal for variably controlling the current flow in an opposite direction supplied to said motor to be controlled;

(c) first signal means responsive to the counter electromotive force voltage of said motor to be controlled;

(d) second signal means responsive to the counter electromotive force voltage of said motor to be controlled for providing a second control voltage of a magnitude equal to said first control voltage but of opposing character;

(e) speed setting control means for providing first and second speed setting voltages of equal magnitude but of opposite polarity;

(f) speed responsive means coupled to said motor to be controlled for providing a speed responsive voltage varying directly with the speed of said motor to be controlled;

(g) first control circuit means for combining said first control voltage and said first speed setting voltage to provide said first electrical signal and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means.

2. An electronic motor control system comprising:

(a) first current control means responsive to a first electrical signal for variably controlling the current in a first direction supplied to a motor to be controlled;

(b) second current control means responsive to a second electrical signal for variably controlling the current flow in an opposite direction supplied to said motor to be controlled;

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) speed setting control means for providing first and second speed setting voltages of equal magnitude but of opposite polarity;

(f) speed responsive means coupled to said motor to be controlled for providing a speed responsive voltage varying directly with the speed of said motor to be controlled;

(g) first control circuit means for combining said first control voltage and said first speed setting voltage and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means;

(i) said first current control means including means responsive to a predetermined value of said first electrical signal for cutting off said current in said first direction and said second current conrtol means including means responsive to a like predetermined value of the sum of said second control voltage and said second speed setting voltage for turning on said current flow in said opposite direction;

(j) the output of said first control circuit means comprising said first electrical signal.

3. An electronic motor control system comprising:

(a) first current control means responsive to a first electrical signal for variably controlling the current in a first direction supplied to a motor to be controlled;

(b) second current control means responsive to a second electrical signal for variably controlling the current flow in an opposite direction supplied to said motor to be controlled;

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) a variable source of control setting voltages comprising a fixed amplitude source of voltage, means responsive to said source of voltage for providing selectable values of output voltage and means responsive to said output voltage for providing first and second speed setting voltages which are of equal magnitude but of opposite sense;

(f) speed responsive means coupled to said motor to be controlled for providing a speed responsive voltage varying directly with the speed of said motor to be controlled;

(g) first control circuit means for combining said first control voltage and said first speed setting voltage and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means;

(i) the output of said first control circuit means comprising said first electrical signal.

4. An electronic motor control system comprising:

(a) first current control means responsive to a first electrical signal for variably controlling the current in a first direction supplied to a motor to be controlled;

(b) second current control means responsive to a second electrical signal for variably controlling the current flow in an opposite direction supplied to said motor to be controlled;

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) a variable source of control setting voltages comprising a fixed amplitude source of voltage, means responsive to said source of voltage for providing selectable values of output voltage and first and second electrical impedance circuits connected in series across said selectable values of output voltage for providing first and second speed setting voltages which are of equal magnitude but of opposite sense;

(f) speed responsive means coupled to said motor to be controlled for providing a speed responsive voltage varying directly with the speed of said motor to be controlled;

(g) first control circuit means for combining said first control voltage and said first speed setting voltage to provide said first electrical signal and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means;

(i) said first current control means including means responsive to a predetermined value of said first electrical signal for cutting off said current in said first direction and said second current control means including means responsive to said speed responsive voltage and a like predetermined value of the sum of said second control voltage and said second speed setting voltage for turning on said current flow in said opposite direction.

5. The system set forth in claim 4 wherein each of said impedance circuits comprises an electrical resistor, said electrical resistors being of equal value and in series across said selectable value of output voltage.

6. An electronic motor control system comprising:

(a) first thyratron tube responsive to a first electrical signal for variably controlling the current in a first direction supplied to a motor to be controlled.

(b) second thyratron tube responsive to a second electrical signal for variably controlling the current flow in an opposite direction supplied to said motor to be controlled.

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) a variable source of control setting voltages comprising a fixed amplitude source of voltage, means responsive to said source of voltage for providing selectable values of output voltage and first and second electrical impedance circuits connected in series across said selectable value of output voltage for providing first and second speed setting voltages which are of equal magnitude but of opposite sense;

(f) a direct current generator mechanically coupled to said motor for providing a speed responsive voltage varying directly with speed of said motor;

(g) first control circuit means for combining said first control voltage and first speed setting voltage to provide said first electrical signal and wherein said first control voltage is poled to oppose an increase in current flow by said first thyratron tube and said first speed setting voltage is poled to produce an increase in current flow in said first thyratron tube;

(h) second control circuit means for combining said second control voltage, said second speed setting voltage and said speed responsive voltage to provide said second electrical signal and wherein said second control voltage and said second speed responsive voltage are poled to increase current flow by said second thyratron tube and said second speed setting voltage is poled to oppose current flow by said second thyratron tube;

(i) first control means responsive to a predetermined value of said first electrical signal for cutting off said current in said first direction and second control voltage and said second speed setting voltage for turning on said current flow in said opposite direction.

7. An electronic motor control system comprising:

(a) first thyratron tube responsive to a first electrical signal for variably controlling the current in a first direction supplied to a motor to be controlled comprising first current control means;

(b) second thyratron tube responsive to a second electrical signal for variably controlling the current flow in an opposite direction supplied to said motor to be controlled comprising second current control means;

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) a variable source of control setting voltages comprising a fixed amplitude source of voltage, means responsive to said source of voltage for providing selectable values of output voltage and first and second electrical impedance circuits connected in series across said selectable values of output voltage for providing first and second speed setting voltages which are of equal magnitude but of opposite sense;

(f) a direct current generator mechanically coupled to said motor for providing a speed responsive voltage varying directly with speed of said motor;

(g) first control circuit means for combining said first control voltage and said first speed setting voltage and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second control means and said second speed setting voltage is poled to oppose current flow by said second current control means;

(i) said first current control means including means responsive to a predetermined value of said first electrical signal for cutting off said current in said first direction and said second current control means including means responsive to a like predetermined value of the sum of said second control voltage and said second speed setting voltage for turning on said current flow in said opposite direction;

(j) the output of said first control circuit means comprising said first electrical signal.

8. An electronic motor control system comprising:

(a) first thyratron tube responsive to a first electrical signal for variably controlling the current in a first direction supplied to a motor to be controlled comprising first current control means;

(b) second thyratron tube responsive to a second electrical signal for variably controlling the current flow in an opposite direction supplied to said motor to be controlled comprising second current control means;

(c) first signal means responsive to the counter electromotive force voltage of said motor to be controlled for providing a first control voltage;

(d) second signal means responsive to the counter electromotive force voltage of said motor to be controlled for providing a second control voltage of a magnitude equal to said first control voltage but of opposing character;

(e) a variable source of control setting voltages comprising a fixed amplitude source of voltage, means responsive to said source of voltage for providing selectable values of output voltage and first and second electrical impedance circuits connected in series across said selectable values of output voltage for providing first and second speed setting voltages which are of equal magnitude but of opposite sense;

(f) a direct current generator mechanically coupled to said motor for providing a speed responsive voltage varying directly with speed of said motor;

(g) first control circuit means for combining said first control voltage and said first speed setting voltage and wherein said first control voltage is poled to oppose an increase in current flow by said first current control means and said first speed setting voltage is poled to produce an increase in current flow in said first current control means;

(h) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means;

(i) a source of fixed bias being common to said first and second control circuit means and being poled to tend to oppose current flow through said first and second thyratron tubes;

(j) said first current control means including means responsive to a predetermined value of said first electrical signal for cutting off said current in said first direction and said second current control means including means responsive to a like predetermined value of the sum of said second control voltage and said second speed setting voltage for turning on said current flow in said opposite direction;

(k) the output of said first control circuit means comprising said first electrical signal.

9. An electronic motor control system comprising:

(a) a direct current shunt motor;

(b) first current control means including a thyratron tube responsive to a first electrical signal for variably controlling the current in a first direction supplied to a motor;

(c) second current control means including a thyratron tube responsive to a second electrical signal for variably controlling the current flow in an opposite direction supplied to said motor;

(d) first signal means responsive to the counter electromotive force voltage of said motor for providing a first control voltage;

(e) second signal means responsive to the counter electromotive force voltage of said motor for providing a second control voltage of a magnitude equal to said first control voltage but of opposing character;

(f) a variable source of control setting voltages comprising a fixed amplitude source of voltage, means responsive to said source of voltage for providing selectable values of output voltage and first and second electrical impedance circuits connected in series across said selectable values of output voltage for providing first and second speed setting voltages which are of equal magnitude but of opposite sense;

(g) a direct current generator mechanically coupled to said motor for providing a speed responsive voltage varying directly with speed of said motor;

(h) first control circuit means for combining said first control voltage and said first speed setting voltage to provide said first electrical signal and wherein said first control voltage is poled to oppose an increase in current flow by said first current control means and said first speed setting voltage is poled to produce an increase in current flow in said first current control means;

(i) second control circuit means for combining said second control voltage, said second speed setting voltage and said speed responsive voltage to provide said second electrical signal and wherein said second control voltage and said second speed responsive voltage are poled to increase current flow by said second current control means and said second speed setting voltage is poled to oppose current flow by said second current control means;

(j) said current control means including means responsive to a predetermined value of said first electrical signal for cutting off said current in said first direction and said second current control means including means responsive to a like predetermined value of the sum of said second control voltage and said second speed setting voltage for turning on said current flow in said opposite direction.

References Cited in the file of this patent

UNITED STATES PATENTS 2,576,518    Knauth _____ Nov. 27, 1951